US005841616A

United States Patent [19]

Crosier

[11] Patent Number: 5,841,616

[45] Date of Patent: Nov. 24, 1998

[54] MODULE FOR USE WITH A MINIATURE CIRCUIT BREAKER

[75] Inventor: Mark David Crosier, Gwynedd, Great Britain

[73] Assignee: Delta Circuit Protection & Controls Limited, United Kingdom

[21] Appl. No.: 776,173

[22] PCT Filed: Jul. 18, 1995

[86] PCT No.: PCT/GB95/01692

§ 371 Date: Apr. 9, 1997

§ 102(e) Date: Apr. 9, 1997

[87] PCT Pub. No.: WO96/03759

PCT Pub. Date: Feb. 8, 1997

[30] Foreign Application Priority Data

Jul. 23, 1994 [GB] United Kingdom .................. 9414869

[51] Int. Cl.[6] ...................................................... H02H 3/00

[52] U.S. Cl. ........................... 361/102; 361/92; 361/636; 361/731; 335/18; 335/20

[58] Field of Search .................................... 361/102, 115, 361/170, 187, 91, 92, 42, 44, 45, 634, 636, 656, 728, 729, 730, 731; 335/18, 20, 21, 22, 23

[56] References Cited

U.S. PATENT DOCUMENTS

| | | | |
|---|---|---|---|
| 3,812,400 | 5/1974 | Gryctko et al. | 361/45 |
| 4,608,546 | 8/1986 | Westermeyer | 335/20 |
| 4,686,600 | 8/1987 | Morris et al. | 361/42 |
| 5,657,193 | 8/1997 | Purkayastha | 361/23 |

FOREIGN PATENT DOCUMENTS

| | | |
|---|---|---|
| 0 076 999 | 4/1983 | European Pat. Off. . |
| 0 138 429 | 4/1985 | European Pat. Off. . |
| 0 589 780 A1 | 3/1994 | European Pat. Off. . |
| 2 003 575 | 11/1969 | France . |
| 3339400 A1 | 5/1985 | Germany . |
| 91 05 489.3 | 9/1992 | Germany . |
| 91 05 489.3 | 10/1992 | Germany . |
| 4215900 C1 | 12/1993 | Germany . |
| 719219 | 12/1954 | United Kingdom . |

*Primary Examiner*—Jeffrey A. Gaffin
*Assistant Examiner*—Michael J. Sherry
*Attorney, Agent, or Firm*—Fishman, Dionne, Cantor & Colburn

[57] ABSTRACT

A module for use with the circuit breaker, the module being arranged to be mounted on an end of the circuit breaker and to monitor and/or control the circuit breaker and/or an electrical circuit control thereby in use. The module can be active or passive, and, where circuit breakers are ganged in side-by-side relationship, the module can be equal in width to the width of the gang breaker unit to which the module is mounted. The invention also resides in the combination of a module and a circuit breaker.

21 Claims, 3 Drawing Sheets

MODULE FOR USE WITH A MINIATURE CIRCUIT BREAKER

TECHNICAL FIELD

This invention relates to a module for use with a miniature circuit breaker.

BACKGROUND ART

Circuit breakers are electrical switching devices, which may be manually operable, for protecting and controlling the electricity supply to respective electrical circuits in for example a building. The term miniature circuit breaker is abbreviated hereinafter as MCB and is herein intended to mean an electrical circuit breaker the dimensions of which satisfy DIN standard 43880, and circuit breakers of a similar shape and size which are designed so as to be interchangeable with circuit breakers satisfying DIN standard 43880. Usually circuit breakers of a building are grouped together on a distribution board or in an enclosure which may take the form of a consumer unit housing a mounting arrangement and electrical connectors or bus bars associated with the circuit breakers. The grouping of the contact breakers is customarily one or more rectilinear arrays where the contact breakers are positioned side-by-side and thus space lengthways of the array is at a premium. The invention is thus advantageous in relation to many forms of contact breaker but may best be appreciated and understood in relation to MCBs.

MCBs are commonly used in the UK in the electrical consumer units of domestic dwellings and small industrial premises to protect and control the electrical supply to respective electrical circuits of the building. Conveniently MCBs have a re-entrant recess in their rear surface arranged to allow them to be fitted onto a mounting rail provided within the consumer unit or the like. The end faces of the MCB are provided with terminals arranged to receive bus bars or leads to connect the MCB in the respective electrical circuit. MCBs include a manually operable lever often in conjunction with an automatic trip mechanism for operating the contacts of the MCB to break the supply to the respective circuit of the building under particular circumstances. Commonly the trip mechanisms are arranged to switch off the supply if the current flowing through the MCB to the respective circuit remains above a predetermined level for a prolonged period of time or if there is a sudden increase in the current demand.

It is often desirable to provide further functions associated with MCBs, for example residual current safety devices arranged to monitor the residual current level and/or switch off the supply if the residual current exceeds a predetermined limit, remote shunt devices arranged to switch off the supply in response to a remote signal, and over- or under-voltage release devices arranged to switch off the supply when the voltage exceeds or falls below a predetermined level. The provision of such further functions has, in the past, involved the use of wider MCB housings and/or additional DIN standard components which has the disadvantage of taking up space alongside the MCBs, along the mounting rail or the like and so occupying space in the consumer unit or the like which may be needed for additional MCBs associated with other circuits provided within the building, and it is an object of the present invention to obviate or mitigate this problem.

DISCLOSURE OF INVENTION

According to a first aspect of the invention there is provided a module for use with a miniature circuit breaker of the kind intended to be mounted in side-by-side relationship with other circuit breakers, the module being arranged to be mounted upon an end of the housing of the miniature circuit breaker and to perform a monitoring and/or control function associated with the miniature circuit breaker or the circuit controlled thereby in use.

The module is preferably provided with means arranged to cooperate with the circuit breaker housing to mount the module on said housing in a snap-fit manner.

Preferably the snap-fit mounting is non-releasable.

The circuit breaker generally will be an active circuit breaker of the type arranged to break the circuit on detection of a current exceeding a predetermined level, but may in some instances be simply a manually operable switch. The circuit breaker may comprise a single pole device or a multi-pole device.

Conveniently the module is an active device operable to initiate opening of the contacts of the circuit breaker and includes a trip lever which can extend through an opening in an end face of the circuit breaker housing in use to actuate a contact release mechanism of the circuit breaker. Preferably the module includes an electromechanical actuator for moving said trip lever to actuate said release mechanism in use.

Preferably, the module includes means for monitoring residual current or earth leakage. Preferably, where the module is an active device the means for monitoring residual current or earth leakage initiates operation of the trip lever on detection of a residual current exceeding a predetermined level. The module may include means for adjusting the predetermined level.

Where the circuit breaker is a multi-pole unit comprising a plurality of single pole circuit breakers ganged to one another in such a manner that tripping of one circuit breaker to open its contacts results in the associated circuit breakers being tripped, it will be recognized that only one of the circuit breakers needs to be provided with an active module.

The module may, alternatively, comprise a shunt trip unit for tripping the circuit breaker in response to a remote signal; an under voltage release for tripping the circuit breaker on detection of the voltage falling below a predetermined level; or an over-voltage release for tripping the circuit breaker on detection of the voltage exceeding a predetermined level.

The module may alternatively be a passive device for monitoring and displaying the magnitude of the current flowing through the circuit breaker or the voltage applied thereto. As a further alternative the module may include a microprocessor control unit arranged to monitor faults and control the circuit breaker in accordance with the monitored faults or to provide advance warning of impending problems by monitoring changes in the electrical environment.

Preferably where the module is required to monitor the so called residual or earth leakage current in a circuit, the module includes a toroidal sensing winding assembly, and a first conductor extending coaxially through said assembly, said first conductor being hollow so that a second conductor can extend coaxially therethrough such that any current imbalance between the first and second conductors can be sensed by said winding assembly.

Preferably said first conductor is a tubular, non-ferrous metal element extending through the winding assembly and having a terminal attached thereto for connection by a user to a lead, conveniently a neutral lead, of the circuit being monitored, and, in use said second conductor is a further lead, conveniently, a live lead of the circuit, which extends through the first conductor for connection to a terminal of the circuit breaker.

It will be recognized that the provision of a coaxial arrangement of winding assembly and first and second conductors enables the magnetic fields generated when current flows in the conductors to be substantially concentric, so that the risk of the production of a current in the winding, in the absence of an imbalance of the currents in the conductors, is therefore reduced.

A further advantage is that the module requires only one terminal to be connected to the circuit being monitored, the lead constituting the second conductor extending through, but not being electrically connected to, the module.

The residual current module may be passive in that it monitors residual current and provides a warning, or may be active in that it initiates opening of the contacts of the associated circuit breaker.

The invention further resides in any module as defined in combination with an MCB. Where the module is active it has a trip lever co-operable with the contact release mechanism of the MCB.

Preferably the MCB is a multi-pole unit comprising a plurality of single pole circuit breakers ganged to one another in such a manner that tripping of one circuit breaker to open its contacts results in the associated circuit breakers being tripped, only one of the circuit breakers being provided with an active module.

The invention still further resides in the combination of three MCBs in side-by-side relationship and ganged to provide a three phase unit, and an active module of width equal to the three ganged MCB unit, mounted on an end of the unit, and housing a trip lever co-operable with the contact release mechanism of one of the MCBs, such that by virtue of the ganging of the MCBs tripping said one will trip all three.

Preferably said module is arranged to monitor earth leakage in all three phases of a three phase supply controlled by the unit.

BRIEF DESCRIPTION OF THE DRAWINGS

The invention will further be described, by way of example, with reference to the accompanying drawings, in which.

BEST MODE FOR CARRYING OUT THE INVENTION

Figure 1:
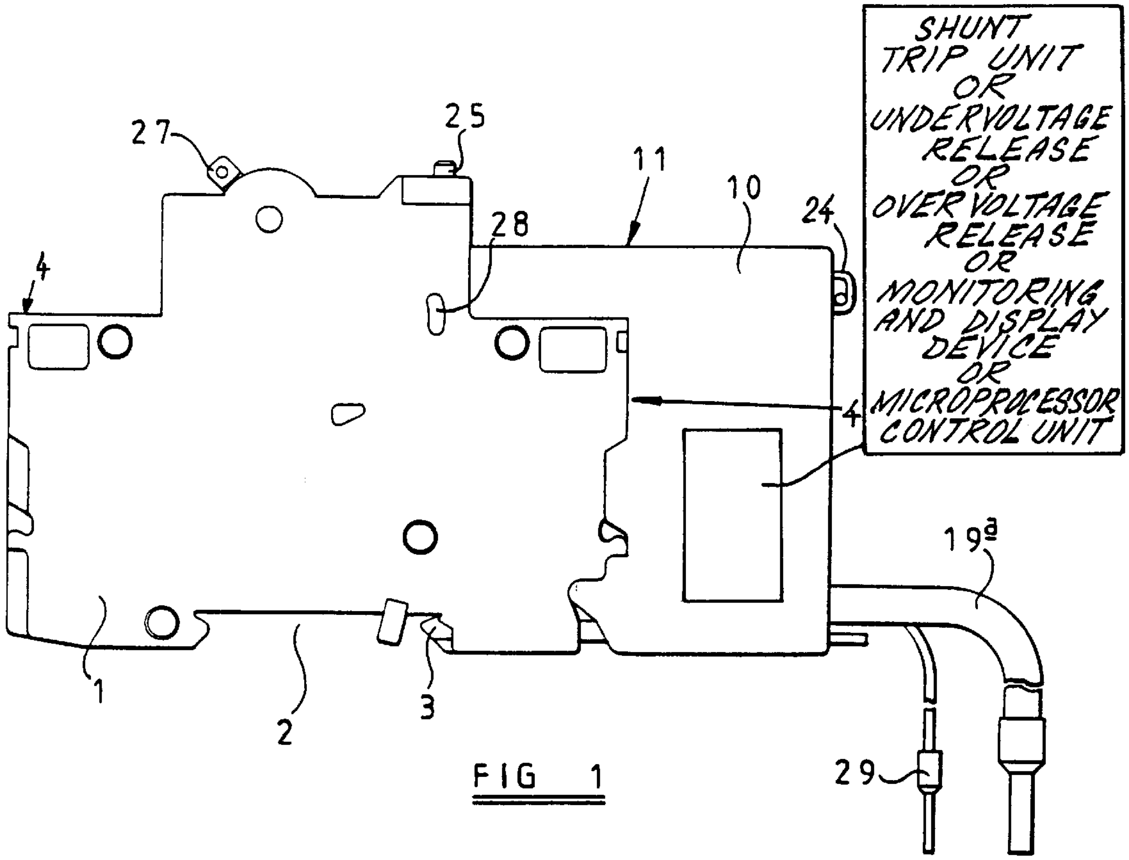
FIG. 1 is a side view of a moulded case MCB with a module attached thereto.

The MCB 1 illustrated in FIG. 1 is shaped so as to satisfy DIN standard 43880 which specifies the external shape and dimensions of a miniature electrical circuit breaker. The MCB 1 includes a recess 2 provided in the rear surface thereof for receiving a mounting rail provided within a domestic consumer unit; a service enclosure; or a distribution board, panel or the like all of which are referred to generically as a "service enclosure". One wall of the recess is provided with a tongue or rail clip 3 which is movable between a retracted position in which an end of the tongue 3 is housed substantially within a slot provided in the body of the MCB 1 and an exposed position in which the end of the tongue 3 protrudes into the recess 2 by an amount such that when the MCB 1 is mounted upon a rail, the tongue 3 engages behind the edge of the rail preventing removal of the MCB 1 therefrom. The tongue 3 is preferably biased towards its exposed position by a helical spring or by the action of a resilient portion of the tongue 3 engaging with a ramped surface provided within the slot.

The end faces 4 of the MCB 1 are apertured to provide access to input and output terminals arranged to be connected in the electrical circuit to be controlled. In domestic wiring, it is common for the MCB to control the live line of the respective circuit. In UK installations often the live connection to the MCB is made by way of a live bus bar provided within the service enclosure, the bus bar being connected to each of the MCBs housed within the enclosure by way of a respective integral tongue received in the live input terminal in one end face of each MCB. The live connection from each MCB to its respective circuit is by way of a lead connected at one end to the output terminal of the MCB at the end face thereof opposite the one receiving the live input. Sometimes the neutral line of the circuit is controlled similarly by a separate MCB ganged to the live MCB but this is unusual in UK domestic wiring systems.

The term MCB as used herein is broad enough to embrace a manually operable switching device in which the contacts are opened and closed in response to manual movement of an operating lever 5. However generally the term MCB is used in relation to devices which in addition have a tripping mechanism for opening the contacts as a result of a rapid rise in the current flowing through the contacts, above a predetermined level, and/or as a result of an excessive current flowing in excess of a predetermined time.

MCBs are arranged to be mounted side-by-side, usually with their adjacent side faces in contact to form one or more rectilinear arrays extending vertically or horizontally. The opposite end faces of the MCBs are thus presented outwardly from the respective array.

Figure 2:
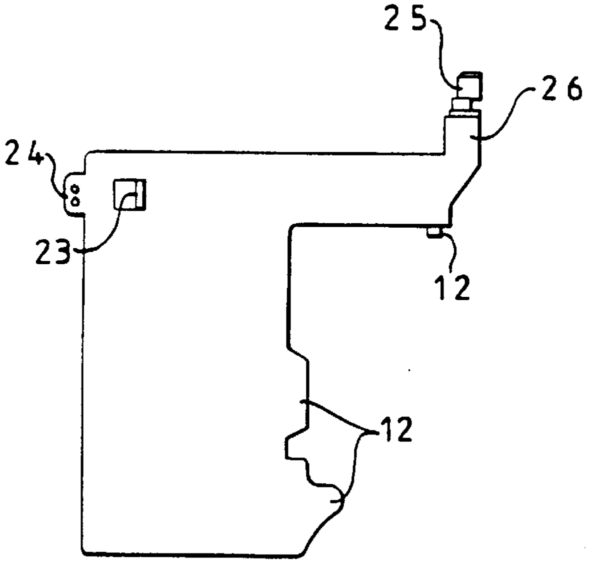
FIG. 2 is a side view of the module of FIG. 1.
Figure 3:
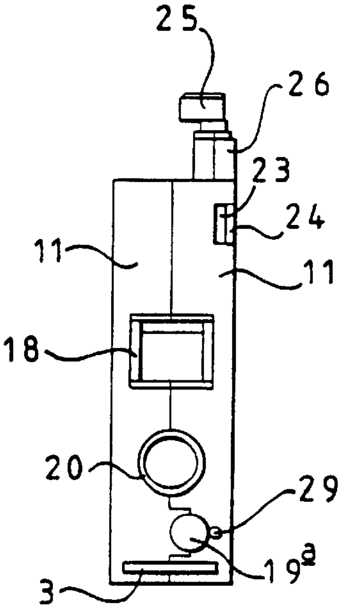
FIG. 3 is an end view of the module of FIGS. 1 and 2.
Figure 4:
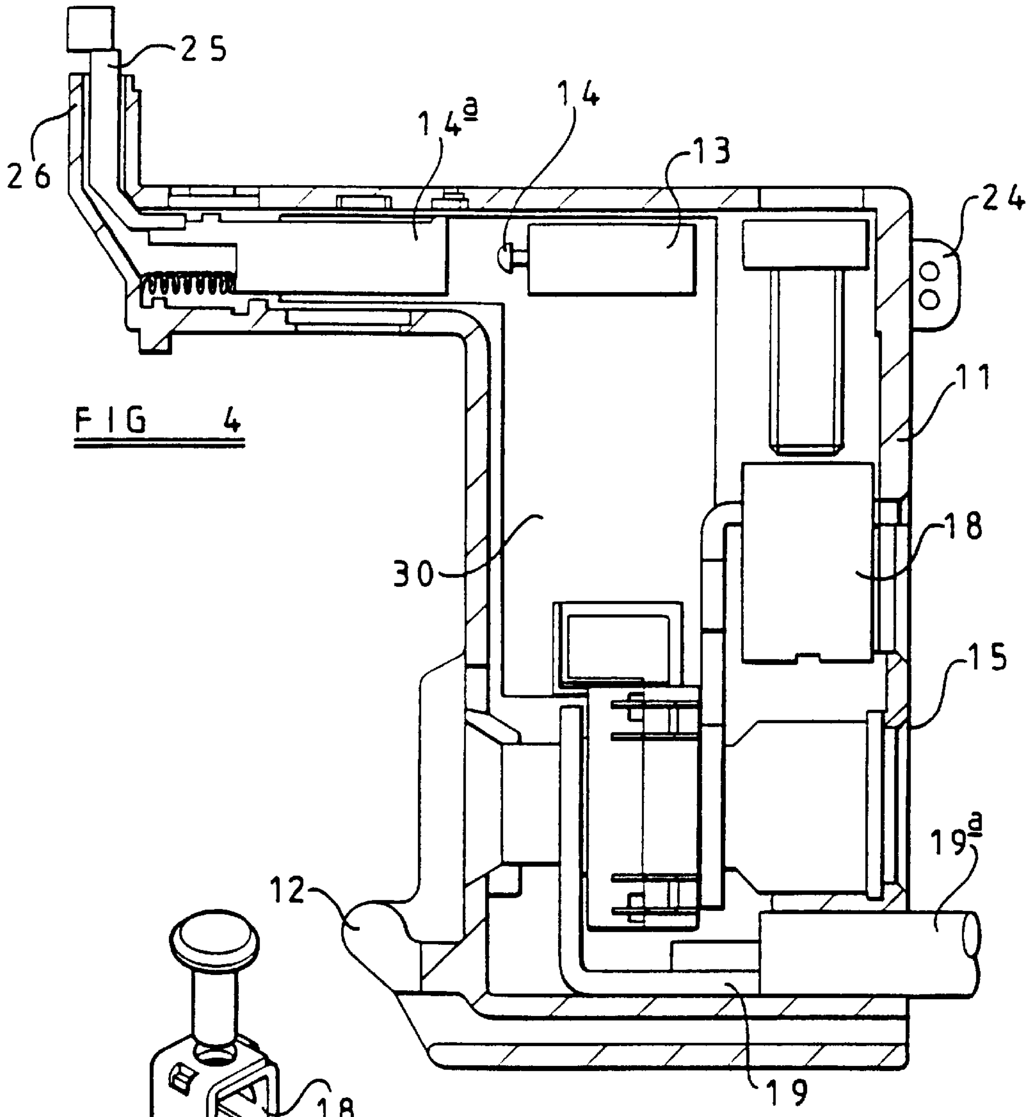
FIG. 4 is a cross sectional view of the module illustrated in FIGS. 1, 2 and 3.
Figure 5:
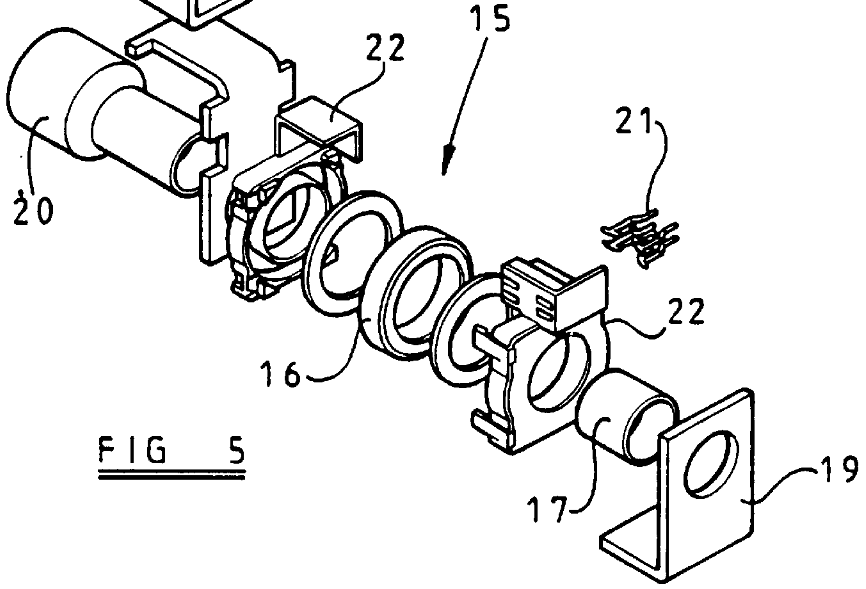
FIG. 5 is an exploded perspective view of part of the module of FIG. 4.

The module 10 illustrated in FIGS. 1, 2 and 3 is arranged to be mounted upon an end face 4 of the MCB 1. The module 10 comprises a two piece plastics housing 11 within which is provided suitable electrical/electronic circuitry to perform the chosen function. One end of the module 10 conforms with the shape of the end face 4 of the MCB 1 and includes protrusions 12 arranged to engage with correspondingly shaped regions of the MCB 1 in order to mount the module 10 onto the MCB 1. The module 10 may be secured to the MCB 1 by way of screws or bolts, but is preferably secured in position in a snap fit manner, the protrusions 12 being arranged to snap into position with respect to the correspondingly shaped regions of the MCB 1. It is preferable for the snap fit arrangement of the MCB and the module to be such that removal of the module 10 is impossible without damaging the module and/or the MCB, such damage providing an indication that a module has been removed.

In the illustrated embodiment, the module 10 comprises a residual current device and is arranged for use in conjunction with an MCB having a tripping mechanism. The housing of the MCB is provided with an opening in the end face 4 thereof normally closed by a blanking plug or a knock-out cover, and which, when open, exposes a release lever of the MCB tripping mechanism, movement of which results in the mechanism operating to open the MCB contacts and so breaking the circuit controlled thereby.

The two piece plastics housing 11 of the module 10 houses a small solenoid 13 arranged so that actuation thereof moves a trip lever 14*a* by way of a trip pin 14, to a position in which an end of the lever 14*a* extends through an opening in the module housing 11 aligned with the opening of the MCB housing and pushes the release lever of the MCB to a position in which the contact release mechanism trips. The solenoid 13 is mounted upon a circuit board 30 and is electrically connected through suitable circuitry also carried by the circuit board 30 to a residual current detector 15 comprising a suitable toroidal ferromagnetic core 16 having a plurality of toroidal windings 16*a* provided thereon. The ends of the windings are connected to terminals 21 which engage and make electrical connections to the board 30. The toroidal winding assembly is mounted within a two piece plastics moulding 22 which snaps together rigidly to support the assembly, and extending coaxially through the core 16 is a tubular copper conductor 17 the ends of which are electrically connected to respective terminals 18, 19. One of the terminals 18 comprises a screw operated clamp arranged releasable to receive a lead, the other terminal 19 being permanently soldered to a flying lead 19*a* which leaves the module through an aperture provided in the housing 11.

Where, as is usual, the MCB is being used to control the live line of the respective circuit, then the flying lead 19*a* will be connected inside the service enclosure to the neutral rail, bus bar or multi-way connector thereof. The neutral lead of the wiring of the relevant circuit (sometimes called the contractors neutral lead) will be connected to the terminal 18. The power supply to the module is derived from the live output terminal of the associated MCB by way of a spring contact protruding from the module to engage the MCB live output terminal.

A plastics tube 20 forming a further part of the housing 11 extends coaxially through the tubular conductor 17, preventing contact with the interior of the conductor 17 from outside of the module 10. The core 16 and the tubular conductor 17 are positioned so that the tube 20 aligns with the aperture in the end wall of the MCB housing through which the MCB output terminal is exposed. The live lead from the circuit being controlled by the MCB (the contractor live lead) is threaded through the plastics tube 20, and hence coaxially through the tubular conductor 17, in use, to reach the MCB output terminal.

It will be recognized that the provision of the tubular conductor 17 which forms part of the neutral line of the circuit, and the live lead, extending coaxially through the core 16 result in a substantially balanced magnetic field being produced when the current passing through the contractors live lead is equal to and opposite that passing through the tubular conductor 17. If the circuit develops a fault resulting in only part of the current returning through the tubular conductor 17, the magnetic field is no longer balanced and a current is produced in the windings of the core 16. The circuitry of the module 10 is arranged to monitor the current produced in the windings, and to actuate the solenoid 13 to trip the circuit breaker when the current in the windings exceeds a predetermined level.

The use of the existing contractors live lead as a primary of the null-balance transformer forming the residual current (or earth leak) monitoring device avoids the need for live lead connections in the module 10. This in turn permits the terminals 18, 19 associated with the conductor 17 to be increased in size, and hence for the module 10 to be able to accommodate a larger range of live lead diameters and so be suitable for use with larger supply currents than would be possible if additional terminals were to be accommodated in the same sized module housing. Thus the wiring requirements imposed upon the contractor are minimized and it is believed that leads up to and including 63 Amp capacity can be accommodated both by the tube 20 and the terminal 18 in an MCB version of the module.

In use, the contractor mounts the module 10 on the "output" end 4 of the MCB and connects the input terminal of the MCB to the live bus bar. The contractors live lead carrying the live supply to the load is passed through the plastics tube 20 and is connected to the live "output" terminal of the circuit breaker in the usual manner, the housing 11 of the module having an aperture providing access to the screw clamp of MCB output terminal. The contractor then connects the contractors neutral lead from the load to the screw clamp terminal 18 and connects the flying lead 19*a* to the neutral bus bar or connector block within the consumer unit. An earth reference lead 29 is also provided, the earth reference lead 29 being connected to the circuitry within the module 10 and extending from the module for connection to the earth rail in the service enclosure. A reference level in the earth reference lead 29 is detected by the circuitry on board 30 and may be used to provide an indication that a loss of neutral; a loss of earth, or a live/neutral reversal, has occurred, with associated tripping of the MCB if desired. The MCB/module combination can be used to monitor the earth and live of the circuit, and to trip when faults arise, in a situation where loss of a neutral connection is not significant. In such circumstances the lead 29 acts as a supply lead supplying power to the circuitry of the board 30.

A switch is provided in the module 10 in order to permit adjustment of the sensitivity of the module in relation to residual current. The switch is operated by a lever 23 which is normally obscured by a retractable cover 24 forming part of the housing 11. In use, the switch is moved until the desired predetermined sensitivity level is obtained. A wire seal is then attached to the cover 24 and a fixed part of the housing through aligned apertures therein to secure the cover 24 in place over the lever 23 to deter unauthorized adjustment of the switch. A window in the housing exposes a marker stipe of the lever 23 to provide a visual indication of the chosen sensitivity setting.

The module further includes a test trip button 25 arranged to allow the user to simulate a residual current fault situation and so test the module 10 to ensure that it will trip the MCB. The test button 25 is arranged to operate a switch in a circuit which results in a current flow in the toroidal windings 16*a* in excess of the threshold set by the sensitivity adjustment switch and should, if the module and MCB are functioning correctly, result in the actuation of the solenoid 13 and hence in tripping of the circuit breaker.

The test button 25 is provided in an upwardly extending portion 26 of the module 10 which extends in use adjacent the manual operating lever 5 of the MCB. Such positioning of the test button 25 ensures that the button 25 is accessible at the exposed front face of the combined MCB and module 10 when mounted within a service enclosure. A snap-fit bezel is provided around the test button 25 to improve the aesthetic appeal of the combination, the bezel including suitable indicia indicating the magnitude of the residual current which results in tripping of the circuit breaker, alternative bezels being provided to accommodate different sensitivity settings.

Where the circuit breaker is a multi-pole circuit breaker of the type comprising, in effect, a plurality of single pole MCBs arranged side-by-side to define the multi-pole unit, it is common for the tripping mechanisms of the circuit breakers to be mechanically interconnected (ganged) by pins extending through openings 28 provided in the side faces of the individual circuit breakers, the connection being such that all of the circuit breakers trip in response to one of the breakers tripping. Thus a single module 10 can be engaged with any one of the three ganged MCBs to monitor residual current in relation to the circuit controlled thereby and cause tripping of all three MCBs of the unit in response to a residual current fault in relation to the selected MCB.

In a two pole arrangement where two side-by-side single pole MCBs are ganged to produce a two pole unit, as may be the case where switching both live and neutral lines of a single phase supply is required, then the module 10 can be engaged with either MCB. Where live and neutral are being switched the module must be associated with the MCB controlling the live line as described above. The contractors neutral lead is connected to the screw operated terminal 18 of the module 10, and the neutral flying lead 19*a* of the module 10 is connected to the output terminal of the neutral MCB, the input terminal of the neutral MCB being connected to the neutral rail of the service enclosure. It will be recognized that if a module is fitted to the neutral MCB rather than the live MCB the module will not be effective as an earth leak detector but, assuming that the module is equipped for detection of live/neutral reversal, the module will immediately trip the ganged MCBs as it will detect what it considers to be a reversal of the intended live and neutral connections to the MCB upon which it is fitted.

Figure 6:
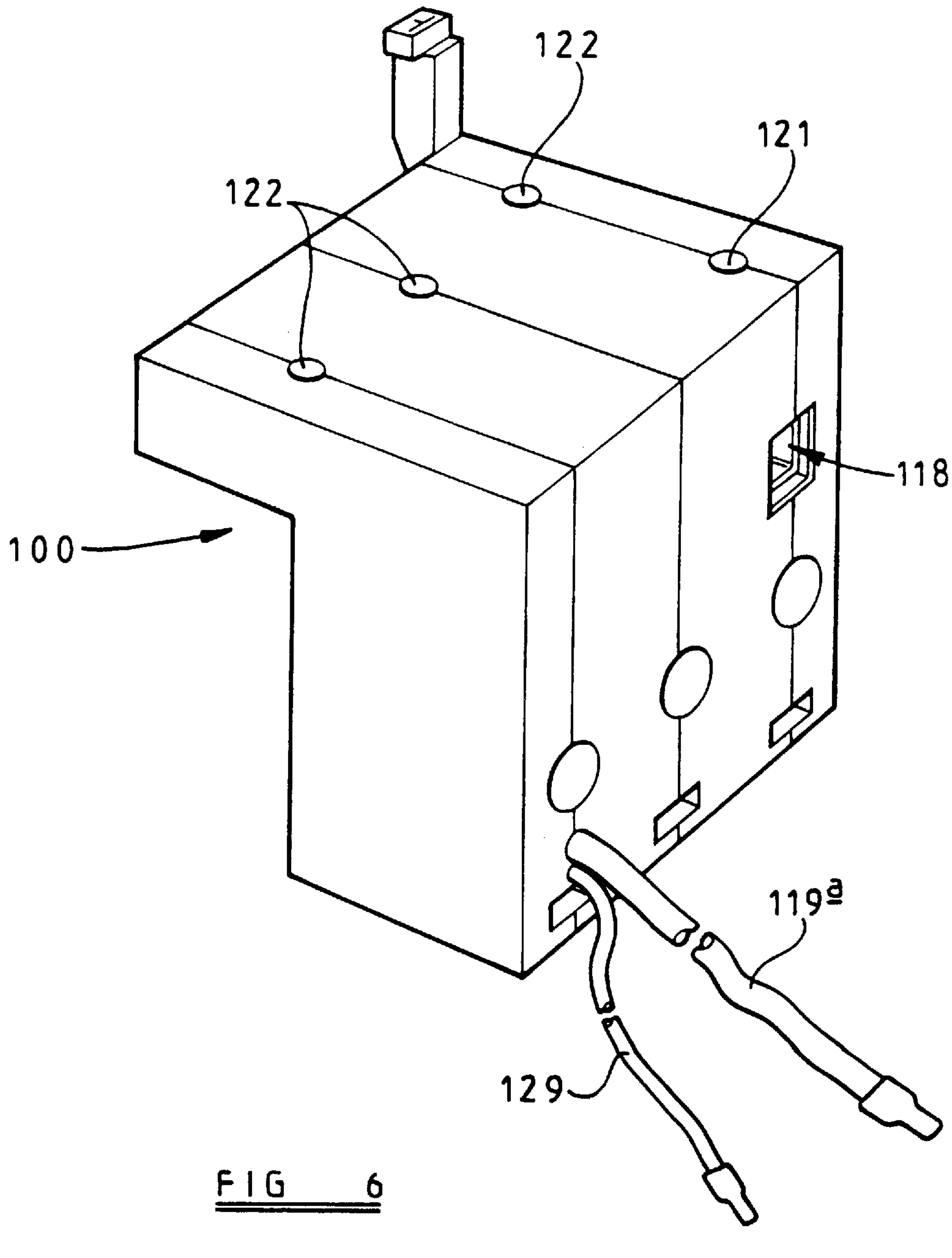
FIG. 6 is a diagrammatic perspective view of a three phase module.

Referring now to FIG. 6 where a triple pole circuit breaker of the type described above in which three side-by-side MCBs are ganged, is used to control the live lines of the phases of a three phase supply, a single wide module 100 equal in width to the three MCB unit may be attached to an end thereof. The module 100 includes one or more residual current detectors electrically linked so that detection of earth leakage in relation to any one or more of the three phases causes actuation of a single solenoid of the module 100 to result in operation of a single trip lever of the module. The single trip lever cooperates with one of the three MCBs, the interconnection (ganging) of the three MCBs resulting in the tripping of all three.

The module 100 has flying neutral lead 119*a* which extends from the housing of the module 100 adjacent an earth reference lead 129. A screw clamp terminal 118 is provided to which the contractors neutral lead, common to the three phases of the supply, is connected, the lead 119*a* being connected to the supply neutral by way of the neutral rail of the consumer unit housing the MCB unit. The terminal 118 is operable by a screwdriver inserted through aperture 121 in the housing wall and three apertures 122 in the same wall provide screwdriver access to the apertures in the MCB housings through which the screw clamps of the respective live output terminals are accessible.

In the installation there will be three live contractors wires associated respectively with the "blue", "yellow" and "red" phases of the supply. Each of these contractors wires will be introduced through a respective aperture 120 in the wall of the housing of the module 100 to pass along a respective tube, through the earth leakage detector to the live output terminal of its respective MCB.

Should there be a leakage from one or more of the live phases to earth then the result will be perceived as a dangerous fault, and the trip mechanism will be operated to trip the chosen one of the ganged MCBs thus tripping all three MCBs and breaking all three live phase connections.

In addition to or as an alternative to tripping an MCB, the modules 10 and 100 may include warning means to provide an indication of the level of the residual current. The warning means may comprise a visible indicator for example a flashing light or lights, an analogue or digital meter output, or may comprise an audible warning. Such a system may be of particular use in applications where a loss of power supply is critical, for example in refrigerated warehouses where a loss in supply may result in the loss of the necessary conditions for safe storage of certain products. The warning would provide an indication that a fault has developed and could provide an opportunity for the fault to be corrected before the supply is disconnected. Where the indicator is used in addition to the tripping means, a non-critical fault could be indicated by the indicator means whereas a dangerous fault exceeding a predetermined level, for example a fault which may put the operators at risk, would result in immediate tripping to turn off the supply.

Other types of single or three phase module may function to provide remote switching of the supply. Such a module would include the solenoid tripping means to operate the tripping mechanism of the associated MCB and would include a wire connection or other means such as an infra-red, microwave, radio or ultrasonic receiver to enable operation of the solenoid from a remote position.

Alternatively, the module may function to monitor the voltage drop across the supplied circuit or circuits and switch off the supply if the voltage exceeds a predetermined level or if the voltage falls below a predetermined level. Further functions which could be performed by the single or three phase module are to monitor the current supplied to the circuit or circuits, displaying the supplied current in any suitable manner, or by means of a microprocessor, the circuit or circuits could be controlled in response to the monitoring of the supplied circuit for faults, possibly switching on backup circuits in response to failures detected in the original circuits. Such a module could also control the circuit in response to other factors, for example ambient temperature or in response to a smoke detector, so long as a suitable sensor is connected to the module. These variations are not intended to be exhaustive and it will be recognized that a number of other functions could be provided within the module individually or in combination and would also fall within the scope of the invention. Some proposed modules which are active in the sense of operating the MCB trip mechanism would be unsuitable for simple MCB devices which have no tripping function. However the passive modules which monitor but do not actuate, can be used with non-tripping MCBs.

It will be recognized that since the modules 10, 100 are mounted on the end face of the respective MCB then they do not take up space along the mounting rail or the like upon which the MCBs are supported. Thus additional functions can be provided without prejudicing the number of MCBs which could otherwise be accommodated in a given application and therefor without prejudicing the number of circuits which can be controlled.

The module may incorporate alternative forms of electromechanical actuator in place of the solenoid 13, for example a diverted flux relay or a device in which the flux of a permanent magnet is negated when necessary by an electromagnet.

I claim:

1. A module for use with a miniature circuit breaker of the kind intended to be mounted in side-by-side relationship with other circuit breakers, the module being arranged to be mounted upon an end of a housing of a previously assembled miniature circuit breaker, the module overlying a terminal of the miniature circuit breaker and being arranged to perform a monitoring and/or control function associated with the miniature circuit breaker or a circuit controlled thereby in use, the module including an electrical contact which protrudes therefrom to engage said terminal of the miniature circuit breaker in use, whereby the module defines its power supply from said terminal of the miniature circuit breaker in use.

2. A module as claimed in claim 1, arranged to mount on said housing in a snap-fit manner.

3. A module as claimed in claim 2, wherein said snap-fit mounting is non-releasable.

4. A module as claimed in claim 1, characterized by being an active device operable to initiate opening of the contacts of the circuit breaker and including a trip lever which can extend through an opening in an end face of the circuit breaker housing in use to actuate a contact release mechanism of the circuit breaker.

5. A module as claimed in claim 4, including an electromechanical actuator for moving said trip lever to actuate said release mechanism in use.

6. A module as claimed in claim 1, including means for monitoring residual current or earth leakage.

7. A module as claimed in claim 4, arranged to monitor residual current or earth leakage and arranged to initiate operation of the trip lever on detection of a residual current exceeding a predetermined level.

8. A module as claimed in claim 1, including a shunt trip unit for tripping the circuit breaker in response to a remote signal.

9. A module as claimed in claim 1, including an under voltage release for tripping the circuit breaker on detection of a voltage falling below a predetermined level.

10. A module as claimed in claim 1, including an overvoltage release for tripping the circuit breaker on detection of a voltage exceeding a predetermined level.

11. A module as claimed in claim 1, comprising a passive device for monitoring and displaying the magnitude of the current flowing through the circuit breaker or the voltage applied thereto.

12. A module as claimed in claim 1, including a microprocessor control unit arranged to monitor faults and control the circuit breaker in accordance with the monitored faults or to provide advance warning of impending problems by monitoring changes in the electrical environment.

13. A module as claimed in claim 1, wherein where the module is required to monitor the so called residual or earth leakage current in a circuit, the module includes a toroidal sensing winding assembly, and a first conductor extending coaxially through said assembly, said first conductor being hollow so that a second conductor can extend coaxially therethrough such that any current imbalance between the first and second conductors can be sensed by said winding assembly.

14. A module as claimed in claim 13, in which said first conductor is a tubular, nonferrous metal element extending through the winding assembly and having a terminal attached thereto for connection by a user to a lead, conveniently a neutral lead, of the circuit being monitored, and, in use said second conductor is a further lead, conveniently, a live lead of the circuit, which extends through the first conductor for connection to a terminal of the circuit breaker.

15. A module as claimed in claim 1, being of a width equal to multiples of the circuit breaker width so as to be associated with two or more circuit breakers which are positioned side to side and are ganged.

16. A combination of a miniature circuit breaker of the kind intended to be mounted in side-by-side relationship with other circuit breakers and having a housing incorporating an end surface, and, a module for performing a monitoring and/or control function associated with the circuit breaker or with a circuit controlled thereby, the module being arranged to be mounted on said end surface of the housing of the miniature circuit beaker so as to overlie a terminal of the miniature circuit breaker, the module including an electrical contact which protrudes from the module to engage said terminal of the miniature circuit breaker whereby the module derives a power supply from said terminal of the miniature circuit breaker.

17. The combination of claim 16, wherein the module is active and includes a trip lever co-operable with a contact release mechanism of the miniature circuit breaker.

18. The combination as claimed in claim 17, wherein the miniature circuit breaker is a multi-pole unit comprising a plurality of single pole circuit breakers ganged to one another in such a manner that tripping of one circuit breaker to open its contacts results in the associated circuit breakers being tripped, only one of the circuit breakers being provided with an active module.

19. In combination, three miniature circuit breakers in side-by-side relationship and ganged to provide a three phase unit, and a module for performing a monitoring and/or control function associated with the circuit breaker or with a circuit controlled thereby, of width equal to the three ganged miniature circuit breaker unit, mounted on an end of the unit, and housing a trip lever co-operable with the contact release mechanism of one of the miniature circuit breakers, such that by virtue of the ganging of the miniature circuit breakers tripping said one will trip all three.

20. The combination of claim 19, wherein said module is arranged to monitor earth leakage in all three phases of a three phase supply controlled by the unit.

21. A retrofitable module for use with a miniature circuit breaker of the kind intended to be mounted in side-by-side relationship with other circuit breakers, the module being arranged to be mounted upon an end of a housing of a previously assembled miniature circuit breaker, the module overlying a terminal of the miniature circuit breaker and being arranged to perform a monitoring and/or control function associated with the miniature circuit breaker or a circuit controlled thereby in use, the module including an electrical contact which protrudes therefrom to engage said terminal of the miniature circuit breaker in use, whereby the module defines its power supply from said terminal of the miniature circuit breaker in use.

* * * * *